United States Patent
Kim

(10) Patent No.: US 6,294,290 B1
(45) Date of Patent: *Sep. 25, 2001

(54) ELECTRODE BINDER FOR A LITHIUM-ION SECONDARY BATTERY AND METHOD FOR MANUFACTURING ACTIVE MATERIAL SLURRY USING THE SAME

(75) Inventor: You-Mee Kim, Chonan (KR)

(73) Assignee: Samsung SDI, Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,835

(22) Filed: May 19, 1998

(30) Foreign Application Priority Data

Jan. 22, 1998 (KR) .................................................. 98-1886

(51) Int. Cl.$^7$ ........................................................ H01M 6/18
(52) U.S. Cl. ............................................ 429/217; 529/255
(58) Field of Search ............................. 429/217; 526/255

(56) References Cited

U.S. PATENT DOCUMENTS

| | | | | |
|---|---|---|---|---|
| 4,302,556 | * | 11/1981 | Endo et al. ........................ | 525/199 |
| 5,238,739 | * | 8/1993 | Susa et al. ........................ | 428/364 |
| 5,589,297 | * | 12/1996 | Koga et al. ........................ | 429/212 |
| 5,614,334 | * | 3/1997 | Kamauchi et al. ................ | 429/217 |
| 5,756,230 | * | 5/1998 | Gao et al. ........................ | 429/192 |
| 5,783,331 | * | 7/1998 | Inoue et al. ........................ | 429/217 |
| 6,019,802 | * | 2/2000 | Ishizuka et al. ................... | 29/623.5 |

FOREIGN PATENT DOCUMENTS

98/59387 * 12/1998 (WO) .

* cited by examiner

Primary Examiner—Necholus Ogden
(74) Attorney, Agent, or Firm—Robert E. Bushnell, Esq.

(57) ABSTRACT

The present invention provides an electrode binder of a lithium-ion secondary battery. The binder includes at least two materials selected from a polyvinylidene fluoride polymer. The materials have the same chemical component as each other but different physical characteristic from each other. The materials are a homopolymer and a copolymer of the polyvinylidene fluoride polymer. The binder also includes at least two materials selected from a rubber polymer binder and a polyvinylidene fluoride polymer. The materials have the different chemical component as each other. A mixture ratio of the homopolymer and the copolymer are selected within a range of 50:50 to 95:5 wt %. It is preferable that the polyvinylidene fluoride and rubber polymer binder are mixed within a rate of 20:80 to 80:20 wt %.

3 Claims, No Drawings

ELECTRODE BINDER FOR A LITHIUM-ION SECONDARY BATTERY AND METHOD FOR MANUFACTURING ACTIVE MATERIAL SLURRY USING THE SAME

BACKGROUND OF THE INVENTION

1. Field of the Invention

The present invention relates to an electrode binder which is enhanced in its adhesion and high capacity characteristics. The present invention further relates to a method for manufacturing an active material slurry for a lithium-ion secondary battery, which contains the electrode binder.

2. Description of the Prior Art

Generally, a lithium-ion secondary battery is a rechargeable battery which is widely used in many applications.

The lithium-ion secondary battery uses a lithium transition metal oxide as a positive electrode and a carbon or graphite as a negative electrode. As an electrolyte, a compound solvent consisting of cyclic carbonates and linear carbonates, to which lithium hexafluoro phosphate ($LiPF_6$) or lithium tetrafluoro boronate ($LiBF_4$) as a supporting electrolyte is added, is used.

Accordingly, when the lithium-ion secondary battery is charged, lithium ions deintercalated from the positive electrode are inserted to the carbon or graphite of the negative electrode. During discharge of the lithium-ion secondary battery, lithium ions deintercalated from the carbon or graphite are inserted to the lithium transition metal oxide of the positive electrode.

The positive and negative electrodes applied with the active material are obtained by passing positive and negative substrates through a container containing an active material slurry, and drying and pressing the same.

The active material slurry consists of active material such as lithium transition metal oxide as the positive electrode and carbon or graphite as the negative electrode, a conducting agent and binder.

Polyvinylidene fluoride (PVDF) which is a fluoride polymer and is less reactive with the organic solvent which is used as the electrolyte is usually used as the binder. Alternatively, polyimide (PI) and rubber which are the polymer materials are also used as the binder.

The performance of the battery mostly depends on kinds of the active material used, and on the kinds of the binder contained in the active material slurry. For example, the cycle life, high capacity, and low temperature characteristic of a battery depend on the types of polymer of PVDF.

That is, if homopolymer of PVDF is used as the binder, required adhesion can be obtained, but it is difficult to coat the active material on the electrode substrate at a uniform thickness due to low liquidity of the active material slurry.

If copolymer of PVDF is used, it is easy to coat the active material on the electrode substrate and the high capacity of the battery can be obtained. However, since the electrolyte content rate becomes higher, the volume expansion of the battery is increased. This results in the active material being separated from the substrate.

SUMMARY OF THE INVENTION

The present invention has been made in an effort to solve the above described drawbacks of each prior binder.

It is an object of the present invention to provide a binder which is improved in its adhesion while providing high capacity characteristic.

It is another object of the present invention to provide a method for manufacturing an active material slurry using the inventive binder.

To achieve the above object, the present invention provides an electrode binder of a lithium-ion secondary battery. The binder comprises at least two materials selected from a polyvinylidene fluoride polymer.

The materials have the same chemical component as each other but different physical characteristic from each other.

According to an embodiment of the present invention, the materials comprise a homopolymer and a copolymer of PVDF. Preferably, a mixture ratio of the homopolymer and the copolymer are selected within a range of 50:50 to 95:5 wt %.

According to another aspect of the present invention, an electrode binder of a lithium ion secondary battery comprises at least two polymer materials which have a different chemical component from each other.

The materials comprise a polyvinylidene fluoride and a rubber polymer binder.

The rubber polymer binder is preferably selected from the group consisting of a styrene butadiene rubber and an ethylene propylene diene monomer(EPDM).

It is also preferable that the polyvinylidene fluoride and rubber polymer binder are mixed within a rate of 20:80 to 80:20 wt %.

According to still another aspect of the present invention, a method of forming an active material slurry used in a lithium-ion secondary battery, comprising the steps of mixing at least two materials selected from a polyvinylidene fluoride, chemical components of the materials being the same as each other and physical characteristic of the materials being different from each other, dissolving the mixture within an n-methyl pyrrolidone solvent, thereby obtaining a binder solution, and mixing an active material and a conducting agent with the binder solution.

According to yet another aspect of the present invention, a method of forming an active material slurry used in a lithium-ion secondary battery, comprising the steps of preparing a binding solution by mixing a rubber polymer binder with an n-methyl pyrrolidone solution containing a polyvinylidene fluoride; and mixing an active material and a conducting agent with the binding solution.

DETAILED DESCRIPTION OF PREFERRED EMBODIMENTS

Reference will be now be made in detail to the preferred embodiments of the present invention.

As described in the above, the electrolyte of the lithium-ion battery is generally made of an organic solvent made of a mixture of cyclic carbonates such as ethylene carbonate, propylene carbonate and linear carbonates such as dimethyl carbonate, diethyl carbonate or ethylmethyl carbonate, to which lithium hexafluoro phosphate or lithium tetrafluoro borate is added. As cyclic carbonates, ethylene carbonate or propylene carbonate is used, and as linear carbonates, dimethyl carbonate, diethyl carbonate or ethylmethyl carbonate is used.

Therefore, as a binder of the active material slurry, the polyvinylidene fluoride which is less reactive with the organic solvent is used. Among the polyvinylidene fluoride, the homopolymer of PVDF which has a high viscosity enhancing the adhesion of the active material on the electrode substrate. However, due to the high viscosity, that is, low liquidity, it has a drawback in that the active material cannot be applied on the electrode substrate at a constant thickness.

Accordingly, in the present invention, to solve the low liquidity problem of the homopolymer of PVDF, copolymer of PVDF which has a relatively low viscosity is added.

At this point, the mixture ratio (wt % ratio) of the copolymer and homopolymer of PVDF each having the same chemical component is preferably selected within a range from 50:50 to 95:5 in consideration of a problem of active material separation from the electrode substrate when using the copolymer of PVDF.

After preparing a binding solution by dissolving the mixture of the homopolymer and the copolymer of PVDF using n-methyl pyrrolidone, the active material and the conducting agent, such as acetylene black or carbon black, are mixed with the binding solution, thereby obtaining an active material slurry of the lithium-ion secondary battery.

According to another embodiment of the present invention, a binder can be produced by mixing a rubber polymer binder and the polyvinylidene fluoride polymer. As the rubber polymer binder, a styrene butadiene rubber which does not contain a fluorine is used to prevent the concentrated heat evolution and the capacity reduction of the battery caused by the extraction of lithium fluorine by the reaction of the fluorine with the lithium metal or lithium ion. And an ethylene propylene diene monomer(EPDM) may be use as the rubber polymer binder The rubber polymer binder exists in the form of a solution or powder and has an advantage of retaining the high capacity characteristic of the battery.

As described above, since the polyvinylidene fluoride polymer mixed with the rubber polymer binder allows the increase of the adhesion between the active material and the electrode substrate, the mixture of the rubber polymer binder and the polyvinylidene fluoride polymer enables the active material slurry to be applied on the electrode substrate at a uniform thickness, increasing the cycle life of the lithium-ion secondary battery.

It is also very important to select the mixture ratio (wt % ratio) of the rubber polymer binder and the polyvinylidene fluoride polymer binder.

According to the present invention, the mixture ratio is preferably selected within a range from 20:80 to 80:20 wt %.

After mixing the solution or powder of the rubber polymer binder with the n-methyl pyrrolidone solution containing the polyvinylidene fluoride polymer, the active material and the conducting agent are added thereto, thereby obtaining the active material slurry.

While the invention will now be described and illustrated in connection with certain preferred embodiment, it should be understood that it is not intended to limit the invention to those particular embodiments and examples On the contrary,. it is intended to cover all alternatives, modifications and equivalents falling within the spirit and scope of the invention as defined by the appended claims.

What is claimed is:

1. An electrode binder of a lithium ion secondary battery comprising a polyvinylidene fluoride polymer and a rubber polymer binder mixed in a range from about 20% by weight polyvinylidene fluoride polymer and 80% by weight rubber polymer binder to about 80% by weight polyvinylidene fluoride polymer and 20% by weight rubber polymer binder.

2. The electrode binder of claim 1, wherein said materials are a polyvinylidene fluoride polymer and a rubber polymer binder.

3. The electrode binder of claim 1, wherein said rubber polymer binder is selected form the group consisting of a styrene butadiene rubber and an ethylene propylene diene monomer (EPDM).

* * * * *